(12) United States Patent
Hanchett (10) Patent No.: US 12,026,987 B2
(45) Date of Patent: Jul. 2, 2024

(54) SYSTEM AND METHODS FOR SETTING RANGES OF MODULAR SYSTEMS IN ELECTRIC VEHICLES

(71) Applicant: Atlis Motor Vehicles, Inc., Mesa, AZ (US)

(72) Inventor: Mark Hanchett, Mesa, AZ (US)

(73) Assignee: ATLIS MOTOR VEHICLES, INC., Mesa, AZ (US)

( * ) Notice: Subject to any disclaimer, the term of this patent is extended or adjusted under 35 U.S.C. 154(b) by 260 days.

(21) Appl. No.: 17/379,643

(22) Filed: Jul. 19, 2021

(65) Prior Publication Data

US 2022/0262168 A1  Aug. 18, 2022

Related U.S. Application Data

(60) Provisional application No. 63/055,729, filed on Jul. 23, 2020.

(51) Int. Cl.
| | |
|---|---|
| *G07C 5/00* | (2006.01) |
| *B60K 7/00* | (2006.01) |
| *B60K 35/00* | (2024.01) |
| *B60L 15/20* | (2006.01) |
| *B60W 10/08* | (2006.01) |

(52) U.S. Cl.
CPC ............ *G07C 5/008* (2013.01); *B60K 7/0007* (2013.01); *B60K 35/00* (2013.01); *B60L 15/2009* (2013.01); *B60W 10/08* (2013.01)

(58) Field of Classification Search
None
See application file for complete search history.

(56) References Cited

U.S. PATENT DOCUMENTS

| | | | |
|---|---|---|---|
| 2004/0044448 A1* | 3/2004 | Ramaswamy | B60L 58/10 180/65.235 |
| 2021/0229701 A1* | 7/2021 | Claesson | B60R 16/0232 |
| 2022/0126848 A1* | 4/2022 | Gaither | B60W 30/19 |

* cited by examiner

*Primary Examiner* — James J Lee
*Assistant Examiner* — Jonathan E Reinert
(74) *Attorney, Agent, or Firm* — IPTechLaw (57) ABSTRACT

An electric vehicle includes a type identifier that identifies the type of the electric vehicle. The electric vehicle may provide the type identifier to a server. The server may access a database and return a vehicle type record associated with the type identifier. Each system of electric vehicle performs a function of the electric vehicle. A system may need to perform in one manner while installed in a first type of electric vehicle and in another manner while installed in a second type of electric vehicle. The vehicle type record includes a range for each system for the type of the electric vehicle. The electric vehicle uses the range to program its systems to operate within the range suitable for the type of electric vehicle.

17 Claims, 9 Drawing Sheets

Infotainment

| Alarm | | Video | | GPS | | Audio | | | | |
|---|---|---|---|---|---|---|---|---|---|---|
| Network | Local | Passenger | Back Seat | Steering | Guidance | Satellite Radio | On-Air Radio | CD/DVD | USB | |
| ✓ | ✓ | ✓ | ✗ | ✗ | ✓ | ✓ | ✓ | ✗ | ✓ | Sports Car |
| ✗ | ✓ | ✓ | ✓ | ✗ | ✓ | ✓ | ✓ | ✗ | ✓ | Sedan |
| ✗ | ✓ | ✓ | ✓ | ✗ | ✓ | ✓ | ✓ | ✗ | ✓ | Light Truck |
| ✗ | ✓ | ✓ | ✓ | ✗ | ✓ | ✓ | ✓ | ✗ | ✓ | Van |
| ✓ | ✗ | ✓ | ✗ | ✗ | ✓ | ✓ | ✓ | ✓ | ✓ | Heavy Truck |
| ✗ | ✗ | ✗ | ✗ | ✓ | ✗ | ✓ | ✗ | ✗ | ✓ | Tractor |
| ✓ | ✗ | ✗ | ✗ | ✗ | ✗ | ✗ | ✓ | ✗ | ✓ | Construction Equipment |

✓ Featured Enabled
✗ Featured Disabled

SYSTEM AND METHODS FOR SETTING RANGES OF MODULAR SYSTEMS IN ELECTRIC VEHICLES

BACKGROUND

Embodiments of the present invention relate to systems used in electric vehicles of different types.

Manufacturers and users of electric vehicles may benefit from systems (e.g., component) that may be used in different types of electric vehicles but whose operating characteristics may be set (e.g., programmed) for operation for the type of vehicle into which they are installed. Using the same system in many different types of vehicles may provide cost savings through economy of scale.

SUMMARY

Some of the various embodiments of the present disclosure relate to systems for electric vehicles. The systems may be installed into different types of electric vehicles then set to operate in accordance with the type of electric vehicle into which the system is installed. Systems may include steering systems, stopping systems, suspension systems, traction motors, seats and infotainment systems. Different types of electric vehicles may include sports cars, sedans, light trucks, vans, heavy trucks, tractors and construction equipment.

BRIEF DESCRIPTION OF THE DRAWING

Embodiments of the present invention will be described with reference to the figures of the drawing. The figures present non-limiting example embodiments of the present disclosure. Elements that have the same reference number are either identical or similar in purpose and function, unless otherwise indicated in the written description.

DETAILED DESCRIPTION

Overview

A system (e.g., component) may be configured to operate differently when installed into different types (e.g., classes, classifications, categories) of electric vehicles. A system may be configured to operate by setting (e.g., programming) parameters of the system to control the operation of the system. For example, electric vehicles are powered by electric motors (e.g., traction motors). The same motor may be used in a sports car or in a farm tractor; however, the range of torque and/or the range of speed of the traction motor may be programmed differently for operation in the sports car as opposed to operation in the farm tractor. For example, the range of torque provided by the traction motor in the sports car may be less than the range of torque provided by the traction motor installed in the farm tractor. Too much torque in a sports car may cause the wheels to spin, whereas too little torque in the farm tractor may limit the functions that may be performed by the farm tractor. With respect to torque, the word range refers to a lower limit of torque and an upper limit of torque provided by the traction motor. The upper limit and the lower limit of torque for the farm tractor would be much higher than the upper limit and the lower limit of torque for the sports car. Further, the range of speed provided by the traction motor in the sports car may be greater than the range of speed provided by the traction motor in the farm tractor. The range of torque and/or the range of the speed of the traction motor may be set (e.g., programmed) in accordance with the type of vehicle into which the traction motor is installed.

As discussed above, different types of electric vehicles may include sports cars, sedans (e.g., for passengers), light trucks (e.g., including pickup trucks), vans (e.g., passenger, cargo), heavy trucks (e.g., tractor-trailer, flatbed, box, dump), tractors (e.g., farm, earthmoving, construction, graders) and construction equipment (e.g., boom lift, rough terrain forklift, bulldozer, scraper, tobacco, excavator, drum rollers). Types of electric vehicles may be categorized or grouped in any manner including by weight, intended use, function performed, and types of consumers likely to purchase and use the electric vehicle.

In an example embodiment, the range of operation for a particular system when installed in a particular type of electric vehicle may be set at manufacture and/or assembly of the vehicle. In another example embodiment, the range of operation for a particular system may be set prior to sale. As discussed above, systems may include steering systems, stopping (e.g., braking) systems, suspension systems, traction motors, seats and infotainment systems or any other type of system that may be installed into an electric vehicle.

In another example embodiment, the range of operation of a system installed in a particular type of vehicle may be further adjusted, within the set range for that type of vehicle, by a user as discussed in U.S. patent application Ser. No. 17/216,150 filed on Mar. 29, 2021 and entitled "Methods and Apparatus for a Geometric and Driver Profiles for a Vehicle", which is hereby incorporated by reference in its entirety for any purpose.

Vehicles and Systems

As discussed above, there may be a variety of different types of electric vehicles. Different types of electric vehicles may have different uses, such as, passenger vehicles, business vehicles, farming vehicles and/or construction vehicles. Different types of electric vehicles may fall into different weight classes (e.g., groups). Different types of electric vehicles may perform different functions, such as transporting people, transporting goods, tilling the ground, or performing construction tasks. Different types of electric vehicles have different performance characteristics to meet the requirements of their different uses, weights and/or functions. In discussing the various types of electric vehicles and the operational characteristics of their respective systems, example electric vehicles include, but are not limited to, sports cars, sedans, light trucks, vans, heavy trucks, tractors and construction equipment.

Systems that may be used in various types of electric vehicles include, but are not limited to, steering systems, stopping (e.g., braking) systems, suspension systems, traction motors, seats and infotainment systems. For example, a steering system may be respectively installed in a sports car or a farm tractor. The operation of the steering system (e.g., angle of orientation) in the sports car may be significantly different from the operation of the steering system in the farm tractor. Since the same type of steering system may be installed in the sports car and in the farm tractor, the different characteristics of operation are set (e.g., programmed) for the sports car type electric vehicle and the farm tractor type electric vehicle.

Figure 1:
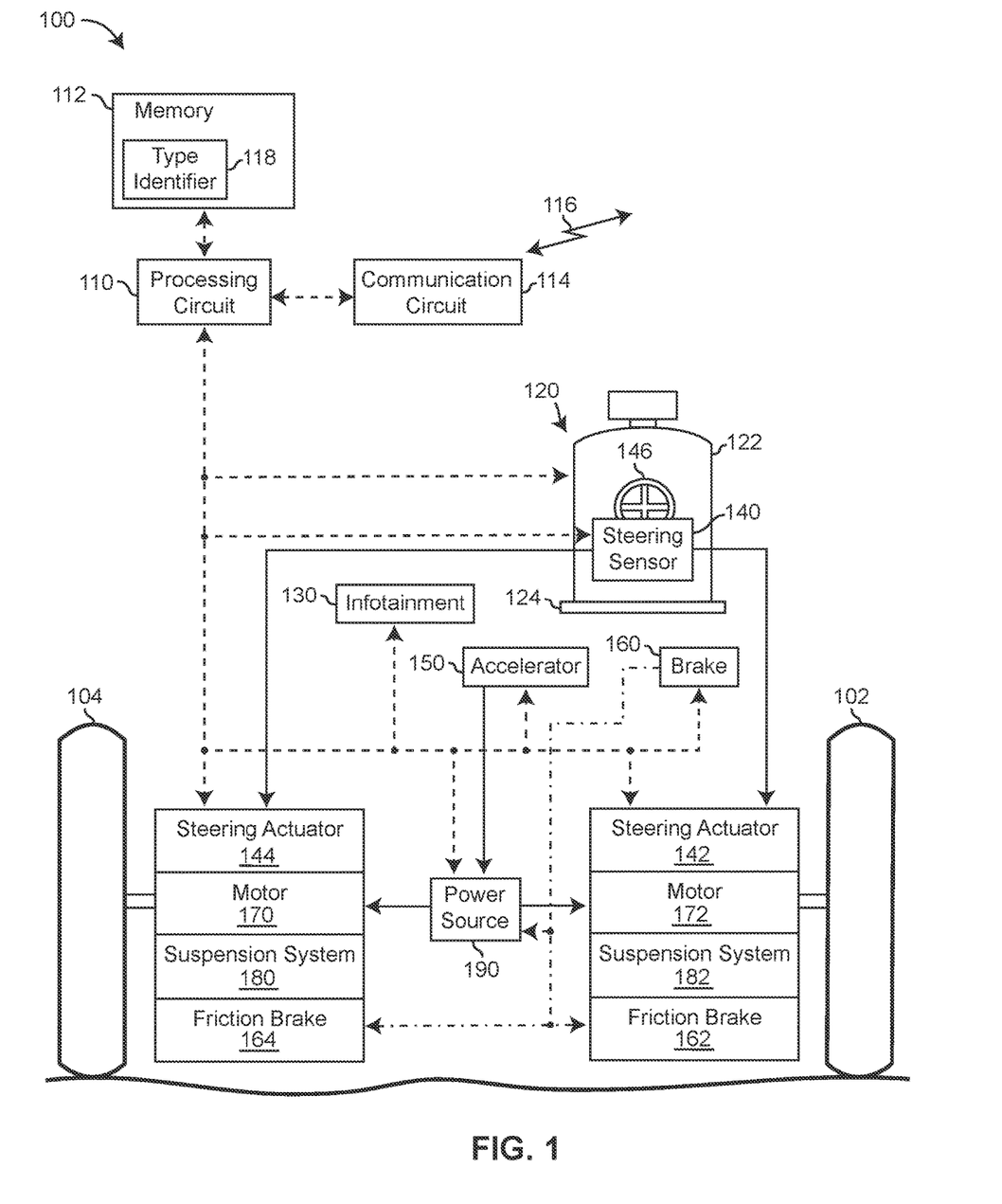
FIG. 1 is a diagram of an example embodiment of an electric vehicle with a plurality of systems installed.

In an example embodiment, electric vehicle 100 as shown in FIG. 1, includes the seat 120, the infotainment system 130, the steering system (e.g., 140, 142, 144), the traction motor 170 and 172, the suspension system 180 and 182, the brake (e.g., stopping) system (e.g., 160, 162, 164) and the power source 190. The seat 120 includes the back 122 and the base 124. The various systems may be installed into different types of electric vehicles.

Generally, the systems of the electric vehicles are controlled by electronic, electric and/or electromechanical devices. Setting the operational characteristics of a system may include installing and/or activating a particular version of the firmware (e.g., software in any form) to control the electronic, electric and/or electromechanical devices of the system. The operational characteristics of a system controlled by firmware may include the physical operation of the device (e.g., motion, rotation) that make up the system. The operation of the devices controlled by the firmware may include functions or modes of operation. Programming a system may enable some functions, but not other functions.

Server and Database

Programming the operation of a system may include accessing a database to retrieve parameters for programming the system. A database may store information regarding types of vehicles and systems. A server may maintain (e.g., store, retrieve) the data in the database. The server may provide data regarding each system installed in a vehicle type. The data may set the range of operation of each system installed in the electric vehicle in accordance with the type of the vehicle.

Figure 2:
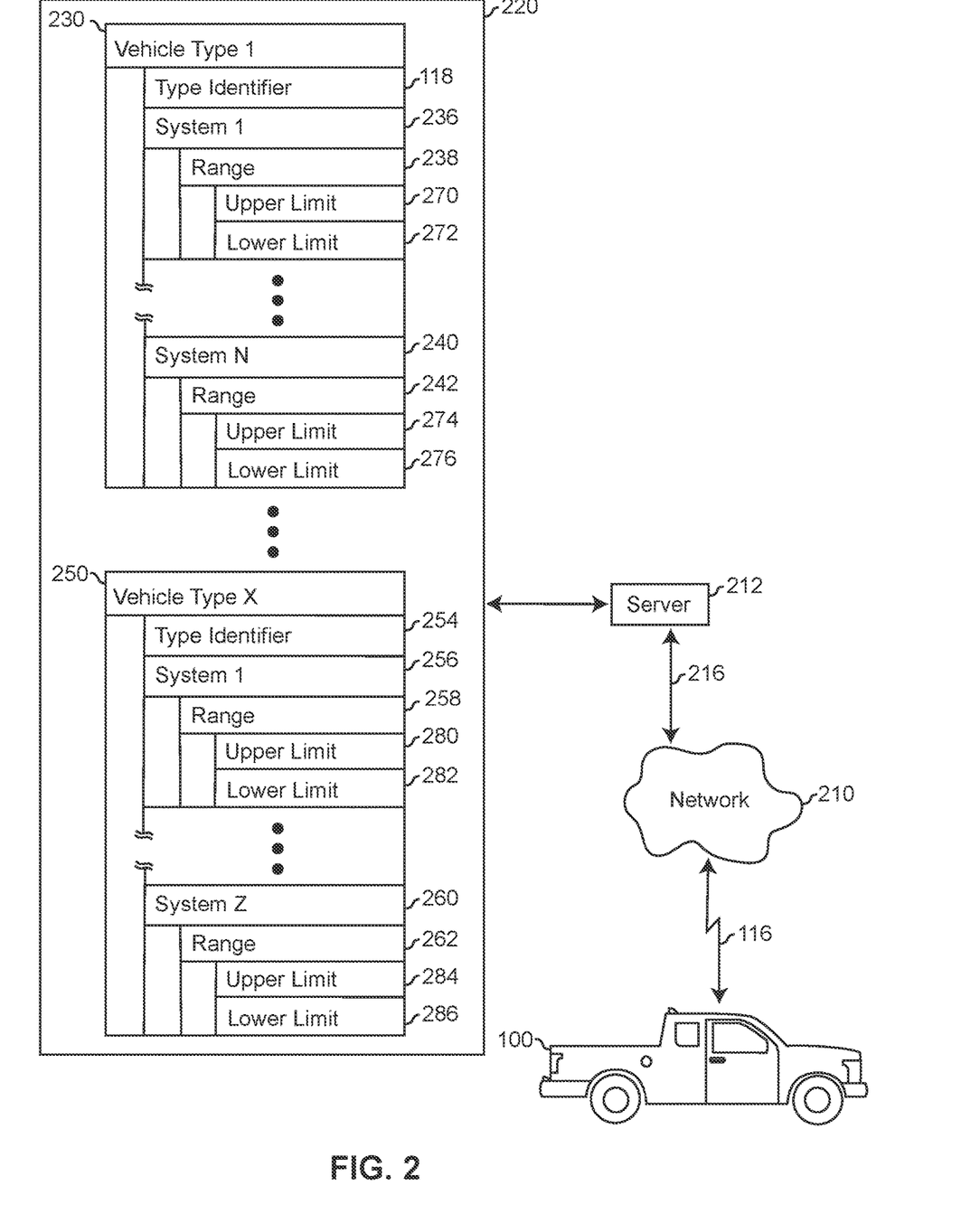
FIG. 2 is a diagram of an embodiment of a system for storing and providing vehicle type records.

In an example embodiment, database 220 includes a plurality of vehicle type records (e.g., 230, 250). Each vehicle type record (e.g., 230, 250) stores system range information for a particular type of electric vehicle. Each vehicle type record (e.g., 230, 250) includes an identifier (e.g., 118, 254) that identifies the vehicle type associated with the data of the record. Each vehicle type record identifies one or more systems (e.g., 236, 240, 256, 260) associated with the vehicle type and includes data for programming the range of operation (e.g., 238, 270, 272, 242, 274, 276, 258, 280, 282, 262, 284, 286) of the system.

In an example embodiment, the electric vehicle 100 provides its type identifier 118 to the server 212 via a network 210. The server 212 accesses the database 220 to find the vehicle type record (e.g., 230, 250) associated with the type identifier 118. Upon finding the vehicle type record, the server 212 sends the vehicle type record to the electric vehicle 100. The range data from the vehicle type record is used by the electric vehicle 100 to program the systems of the electric vehicle 100.

In an example embodiment, the type identifier 118 for the electric vehicle 100 is stored in the memory 112. The processing circuit 110 accesses the memory 112 to retrieve the type identifier 118. The processing circuit 110 transmits the type identifier 118 to the server 212 via the communication circuit 114. Communication circuit 114 communicates with the network 210 via the communication link 116. The communication link 116 may be wired and/or wireless. The processing circuit 110 receives the vehicle type record (e.g., 230, 250) from the server 212 via the network 210, the communication link 116 and the communication circuit 114. The processing circuit 110 extracts the range (e.g., 238, 270, 272, 242, 274, 276, 258, 280, 282, 262) for each system (e.g., 236, 240, 256, 260). A range may include an upper operational limit (e.g., upper limit, 270, 274, 280, 284) and/or a lower operational limit (e.g., lower limit, 272, 276, 278, 286). Rather than having an upper limit and a lower limit, a range may include an enumerated list of functions of the system that are enabled or disabled. The processing circuit 110 provides the range to the system. The processing circuit may provide the range to the system in any manner including transferring the range to the system via an address data bus. After receiving the range, the system conforms its operation to the range and operates within the range.

In an example embodiment, the electric vehicle 100 includes a plurality of systems and a processing circuit 110. Each system operates to perform a function of the electric vehicle 100. The processing circuit 110 receives the vehicle type record (e.g., 230) from the server 212. The vehicle type record (e.g., 230) includes a respective range (e.g., 238, 242) of operation for each system (e.g., 236, 240) of the plurality. Each respective range (e.g., 238, 242) includes a lower operating limit (e.g., 272, 276) and an upper operating limit (e.g., 270, 274). The processing circuit 110 provides the respective range (e.g., 238, 242) to each system of the plurality. Each system operates within the lower operating limit (e.g., 272, 276) and the upper operating limit (e.g., 270, 274) of its respective range.

Steering System

Figure 3:
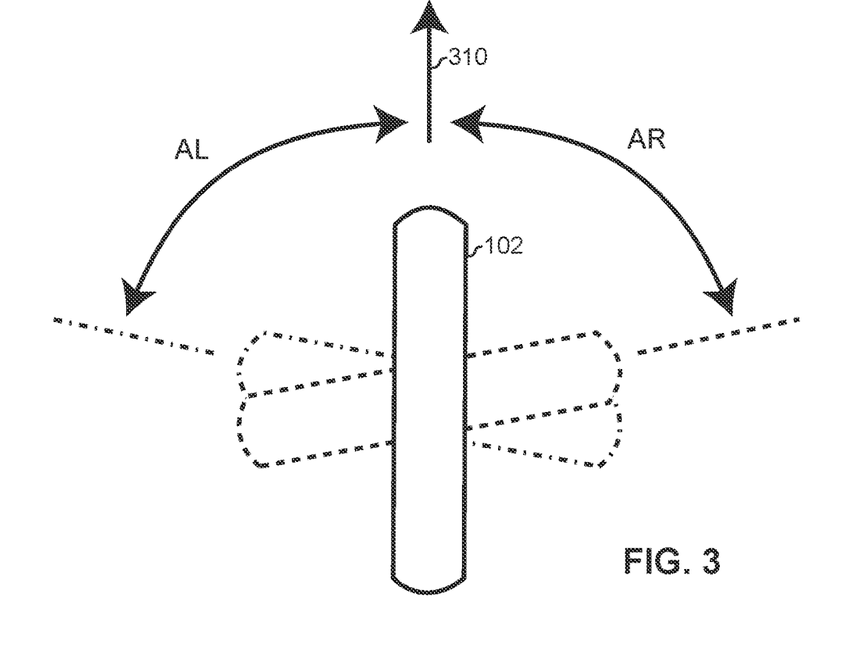
FIG. 3 is a diagram of a range of orientation of a wheel.
Figure 4:
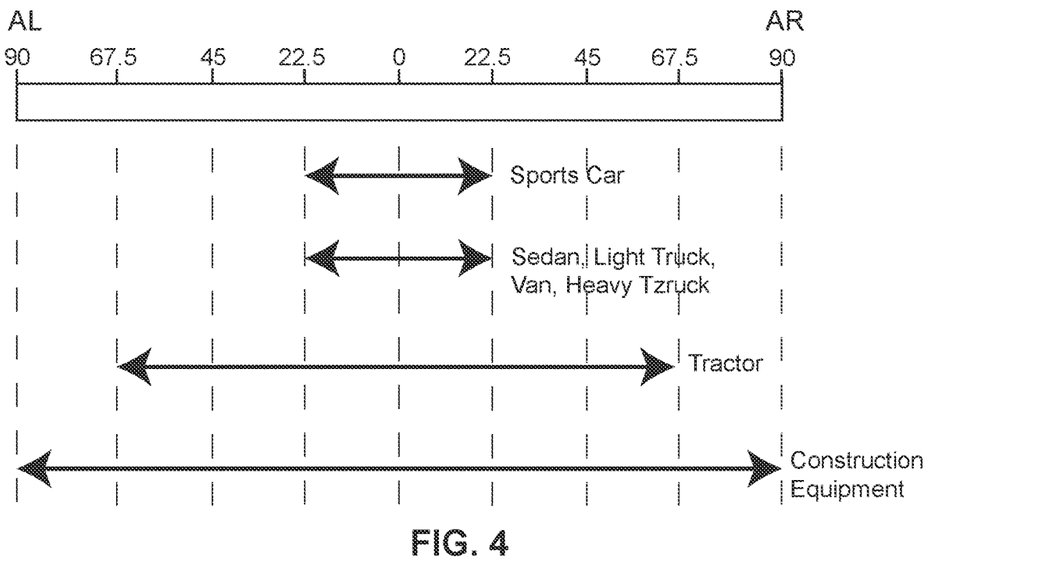
FIG. 4 is a diagram of example ranges of orientation of a wheel for different types of electric vehicles.

In an example embodiment of the steering system (e.g., 140,142, 144, 146), as best shown in FIGS. 1 and 3-4, the steering sensor 140 tracks movement of the steering wheel 146 and provides movement information to the steering actuator 142 and 144. The steering actuator 142 and 144 physically move (e.g., turn) the wheels 102 and 104 to set the orientation of the wheels 102 and 104 respectively. For example, the steering actuator 142, responsive to the steering wheel 146 and the steering sensor 140, may orient the wheel 102 at an angle AR to the right of a forward direction 310, at an angle AL to the left of the forward direction 310, or at any orientation in between the angle AR and AL. The range of the angles AR and AL may be set (e.g., programmed) in accordance with the type of vehicle into which the steering system (e.g., 140, 142, 144, 146) is installed. The steering system will not turn the wheel 102 more than the angle AR and AL as programmed.

In an example embodiment, the steering actuator 142 and 144 are implemented as a rack and pinion. The range of the angles AR and AL may be set by limiting movement of the rack. In an example embodiment, the steering actuator 142 and 144 are implemented as linear actuators. The range of the angles AR and AL may be set by limiting the linear travel of the linear actuator.

In an example embodiment, the steering system installed into a sports car may be programmed to turn the tires (e.g., 102, 104) in a range between AL=22.5 degrees and AR=22.5 degrees. The range of operation of the steering system installed in a sedan, a light truck, a van or a heavy truck may be in the range of AL=24 degrees and AR=24. The range of operation of the steering system installed into a tractor may be broader such that AL=67 degrees and AR=67 degrees. In an example embodiment of construction equipment, the range for the steering system is AL=90 degrees and AR=90 degrees.

The range need not be symmetrical, so that AL may be greater than or less than AR. The range of steering may be in accordance with the structure of the body of the vehicle (e.g., wheel well). The range of steering may be set to improve the safe operation of the vehicle, for example, the range may be limited on vehicle types capable of high speeds to increase the stability of the vehicle. Further aspects of the steering system that may be programmed includes the steering ratio.

In an example embodiment, the plurality of systems of the electric vehicle 100 includes a steering system (e.g., 140, 142, 144, 146). The steering system is adapted to turn one or more wheels 102 and 104 to orient the one or more wheels 102 and 104. The steering system operates within the range (e.g., 238, 242) provided by the processing circuit 110 whereby the steering system turns the one or more wheels 102 and 104 between the lower operating limit and the upper operating limit of the range. In an example embodiment, the lower operating limit comprises a maximum angle to the left (e.g., AL) of the forward direction 310. The upper operating limit comprises a maximum angle to the right (e.g., AR) of the forward direction 310. The steering system turns the one or more wheels 102 and 104 between the maximum angle to the left and the maximum angle to the right. In an example embodiment, the processing circuit 110 gets the range from a vehicle type record.

Stopping System

The system that decelerates movement of the electric vehicle 100 is referred to herein as a stopping system or a brake system. A brake system is adapted to provide a braking force to the one or more wheels 102 and/or 104 to slow the rotation of the one or more wheels 102 and/or 104. The stopping system may include a friction brake 162 and 164 and/or using the traction motor 170 and 172 to slow and/or stop the rotation of the wheels 102 and 104 and thereby to slow and/or stop movement of the electric vehicle 100. Whether the force for stopping the movement of the electric vehicle 100 comes from the friction brake 162 and 164 and/or from controlling power source 190 which provides power to the traction motor 170 and 172, the range of the stopping force provided by the brake system may be set by the processing circuit 110 in accordance with the type of vehicle into which the stopping system is installed. The stopping force provided by the brake system may be in further accordance with the load (e.g., mass, weight) on the electric vehicle.

The stopping force may include the force applied by a pad of a disc brake on a rotor of the wheel 102 or 104. The stopping force may include the amount of current or the polarity of the voltage provided by the power source 190 to the traction motor 170 and/or 172. The stopping force provided to a wheel (e.g., 102, 104) may be different for each wheel. However, the stopping force for each wheel may be within a range so that the minimum force applied and the maximum force applied is within the range. The range for different types of vehicles may be different, so the maximum force and the minimum force applied may be different for different types of vehicles. For example, the force applied by the pad of the disc brake on the rotor of the wheel may be less for a sports car than for a heavy truck.

Figure 5:
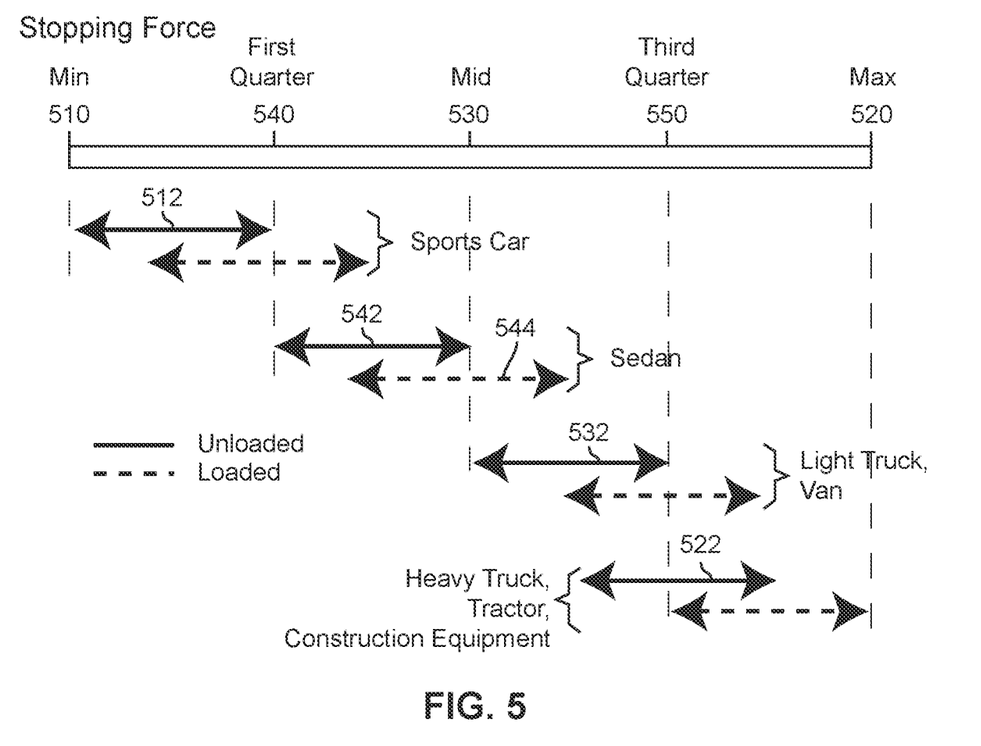
FIG. 5 is a diagram of example ranges of a stopping system for different types of electric vehicles.

In an example embodiment, the stopping system (e.g., 160, 190, 170, 172, 162, 164), as best shown in FIGS. 1 and 5, may provide a force to stop the electric vehicle 100 in a range of a minimum stopping force 510 and a maximum stopping force 520. The amount of force provided by the system may be programmed in accordance with the type of the vehicle. For example, the stopping system when installed in a sports car may be programmed to provide a stopping force in the range of the minimum stopping force 510 to the first quarter stopping force 540. The stopping system when installed in a sedan may be programmed to provide a stopping force in the range of the first quarter stopping force 540 to the mid-stopping force 530. The stopping system when installed in light truck or a van may be programmed to provide a stopping force in the range of the mid-stopping force 530 to third quarter stopping force 550. The stopping system when installed in a heavy truck, a tractor or construction equipment may be programmed to provide a stopping force in the range of more than the mid-stopping force 530 to less than the maximum stopping force 520.

In an example embodiment, the plurality of systems of the electric vehicle 100 includes a brake system (e.g., 160, 190, 170, 172, 162, 164). The brake system is adapted to provide a braking (e.g., stopping) force to one or more wheels 102 and/or 104 to slow the rotation of the one or more wheels 102 and/or 104. The brake system operates within the range provided by the processing circuit 110 whereby the braking force provided by the brake system is greater than or equal to the lower operating limit (e.g., 510) and less than or equal to the upper operating limit (e.g., 540) of the range. In an example embodiment, the processing circuit 110 gets the range from a vehicle type record.

The range of the stopping force may be determined in part by the weight of the vehicle and the expected performance of the type of vehicle. For example, a sports car is lightweight, so the stopping force required to stop the sports car is less than the stopping force required to stop a heavier type of vehicle. So, the range of the stopping force for the sports car closer to the minimum stopping force 510 than to the maximum stopping force 520. In another example, a passenger sedan generally is not expected to have overly aggressive braking characteristics, so a sedan that is close in weight to a light truck may be programmed so that its range 542 of stopping force is less than the range of stopping force 532 programmed for the light truck.

As mentioned above, the range of stopping force may also be in accordance with the load of the vehicle. As the load of the vehicle increases, the limits of the stopping force may be increased to maintain the stopping characteristics of the vehicle. In an example embodiment, the range 542 of the stopping force is sufficient to stop the electric vehicle 100 even when it is loaded to capacity. When the sedan has no load, the stopping force in the lower portion of the range 542 is sufficient to stop the sedan. When the sedan carries a load, the stopping force in the upper portion of the range 542 is sufficient to stop the sedan.

However, in another example embodiment, assume that the sedan is pulling a trailer. The range 542 of the stopping force may be increased (e.g., shifted to the right) to be a range 544 to accommodate the increased weight of the trailer. The available stopping force may be increased by retaining the width of the range 542 but shifting it (e.g., shifting to the right with respect to FIG. 5, range 544) to provide more force. When a load is present, the width of the range 542 may be increased by increasing the maximum force of the range 542 (e.g., maximum force=more than the mid-stopping force 530, range 544).

Suspension System

The suspension system 180 and 182 operate to keep wheel 104 and 102 respectively on the ground and to cushion the electric vehicle 100 from bumps and unevenness on the road. The suspension system 180 and 182 responds to the shocks and jolts experienced by the wheels 102 and 104 as they roll over the terrain. The suspension system may include springs, struts, dampers and/or shock absorbers. The suspension system may be adjusted so that its response fills stiff (e.g., rigid, responsive) or less stiff (e.g., bouncy, less responsive). The operating characteristics of a suspension system may be set by changing a fluid pressure (e.g., air, liquid) of a shock absorber, limiting a range of travel of a spring or strut, and/or changing an angle of orientation of a component (e.g., spring, strut, shock absorber) of the suspension system.

In an example embodiment, the plurality of systems of the electric vehicle 100 includes a suspension system (e.g., 180, 182). The suspension system is adapted to absorb an energy imparted to one or more wheels 102 and/or 104 by the terrain over which the one or more wheels 102 and/or 104 travel. The suspension system operates within the range provided by the processing circuit 110 whereby the energy absorbed by the suspension system is greater than or equal to the lower operating limit and less than or equal to the upper operating limit of the range. In an example embodiment, the processing circuit 110 gets the range from a vehicle type record.

Figure 6:
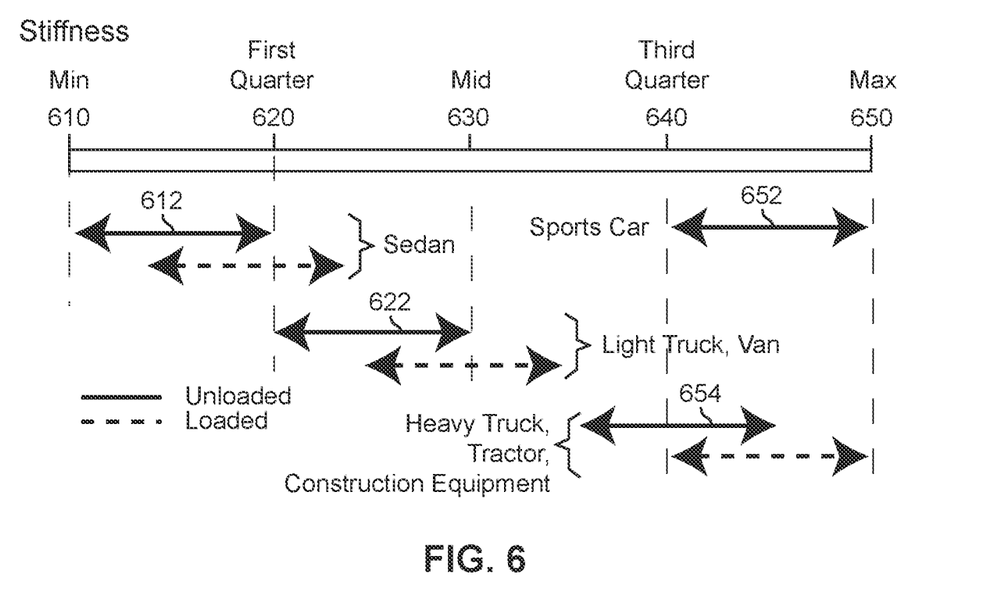
FIG. 6 is a diagram of example ranges of a suspension system for different types of electric vehicles.

The operating characteristics of the suspension system 180 and 182, herein referred to as stiffness, may be set in accordance with the type of vehicle. The stiffness of a suspension system for a type of vehicle may fall within a range. The range for different types of vehicles may be different. In an example embodiment, as best shown in FIG. 6, a range 652 of stiffness of the suspension system for a sports car may have a lower limit of a third-quarter stiffness 340 and an upper limit of the maximum stiffness 650. The range 612 of stiffness for the suspension system for a sedan may have a lower limit of a minimum stiffness 610 and an upper limit of a first quarter stiffness 620. A range 622 of stiffness of the suspension system for a light truck or van may have a lower limit of the first quarter stiffness 620 and an upper limit stiffness of the mid stiffness 630. The range is 654 for the suspension system of a heavy truck, tractor or construction equipment may have a lower limit of greater than the mid stiffness 630 and an upper limit of the maximum stiffness 650.

The range of the stiffness of the suspension system for a type of electric vehicle may be further set in accordance with the load carried and/or pulled by the electric vehicle.

Traction Motor

Electric vehicles include traction motors for providing the motive force to move the electric vehicle. Preferably, the traction motors provide a high starting torque to start movement of the vehicle from a stop. Further, the traction motors include a speed control for controlling the speed of the motor and therefore the speed of rotation of the wheels 102 and 104. The current and/or the voltage of the current provided by the power source 190 to the traction motor 170 and 172 may be reversed to stop movement of the electric vehicle 100, or in other words to provide a stopping (e.g., braking) force.

In an example embodiment, the plurality of systems of the electric vehicle 100 includes a traction motor (e.g., 170, 172). The traction motor (e.g., 170, 172) is adapted to couple to one or more wheels (e.g., 102, 104). The traction motor (e.g., 170, 172) is adapted to rotate the one or more wheels (e.g., 102, 104). The traction motor (e.g., 170, 172) operates within the range provided by processing circuit 110, whereby the torque generated by the traction motor (e.g., 170, 172) is greater than or equal to the lower operating limit and less than or equal to the upper operating limit of the range. In an example embodiment, the processing circuit 110 gets the range from a vehicle type record.

Figure 7:
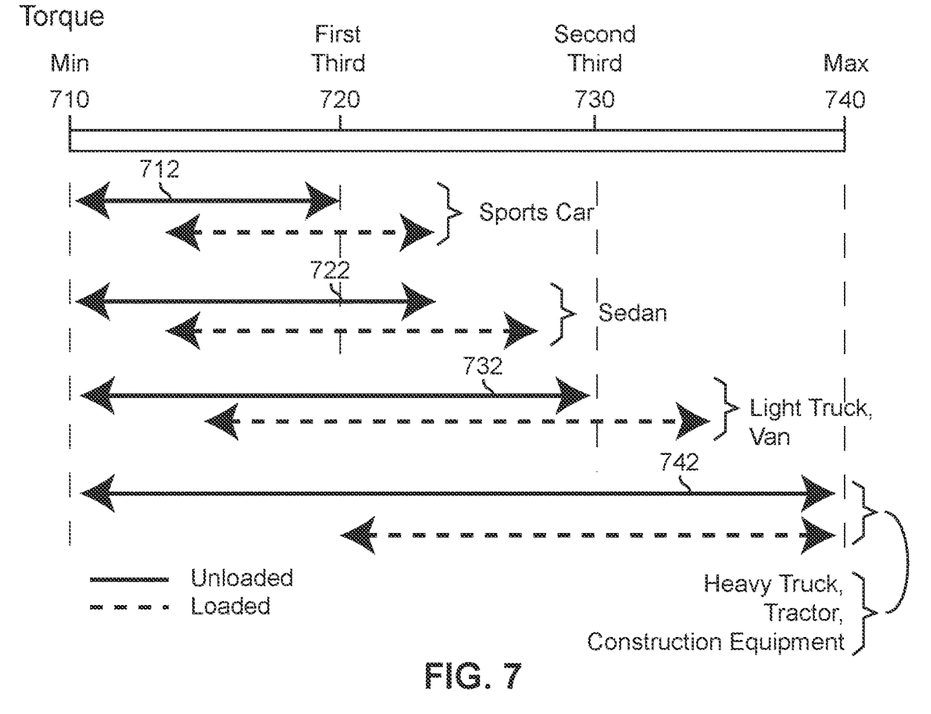
FIG. 7 is a diagram of example ranges of torque provided by a traction motor for different types of electric vehicles.
Figure 8:
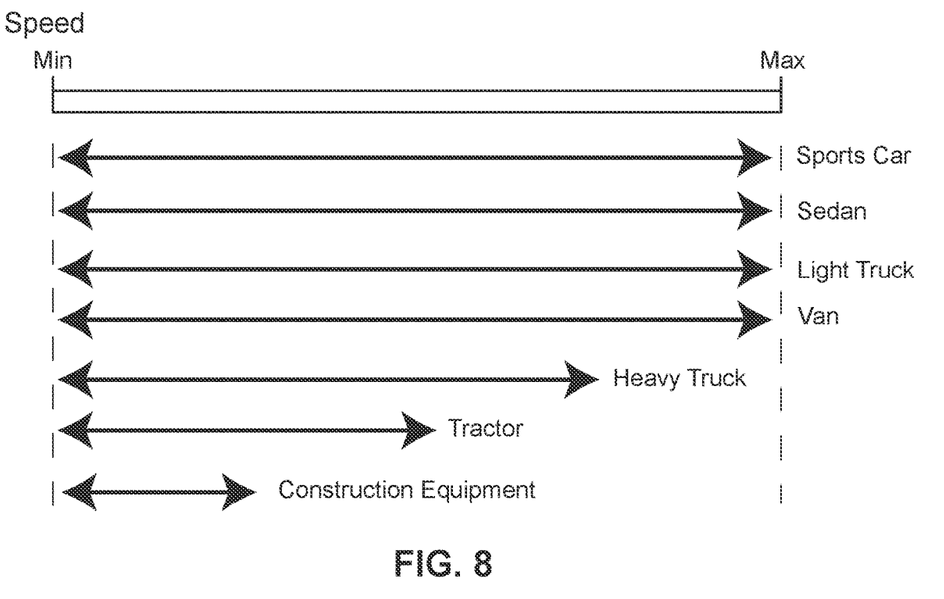
FIG. 8 is a diagram of example ranges of speed provided by a traction motor for different types of electric vehicles.

In an example embodiment, as best shown in FIGS. 1 and 7-8, the electric vehicle 100 includes the traction motor 170, which drives the wheel 104, and the traction motor 172, which drives the wheel 102. The traction motor 170 provides a torque force to turn the wheel 104. The heavier the vehicle, the greater the torque force needed to turn the wheel 104 from a stop to start movement of the electric vehicle 100. In an example embodiment, as best shown in FIG. 7, the range 712 of torque for a sports car may have a lower limit of a minimum torque 710 and an upper limit of the first third torque 720. A range 722 of torque for a sedan may have a lower limit of the minimum torque 710 and an upper limit of more than the first third torque 720. The range 732 of torque for a light truck or van may have a lower limit of the minimum torque 710 and an upper limit of the second third torque a 730. A range 742 of torque for a heavy truck, tractor or construction equipment may have a lower limit of the minimum torque 710 and an upper limit of a maximum torque 740.

The range of the torque of a traction motor for a type of electric vehicle may be further set in accordance with the load carried and/or pulled by the electric vehicle.

The traction motors for light vehicles, such as a sports car, may be programmed to provide torque in a range that is less than the range for a heavier vehicle. For example, the traction motor for a sports car may be programmed to provide torque in the range 712 whereas the traction motor for a light truck or van, which weighs more than the sports car, may be programmed to provide torque in the range 732. The wider range of torque for the light truck or van allows the traction motors to provide more torque to start the heavier vehicles from a stop. If the sports car were to have the same range as the light truck or van, the higher torque provided by the traction motor would likely cause the wheels of the sports car to spin.

The range of the torque for the traction motor in a type of vehicle is matched to the weight of the vehicle and the desire driving characteristics of the vehicle. If the range is too wide, too much torque may be provided to the wheels thereby resulting in spinning the wheels of the vehicle. The operational range program for a type of vehicle may limit the amount of torque provided to the wheels thereby allowing the vehicle to operate, yet reducing wheel spinning.

The range of the speed of operation (e.g., speed of rotation) of a traction motor, as best shown in FIG. 8, may also be programmed. For most vehicle types, the upper limit for the speed of the traction motor is the maximum speed of the traction motor because most vehicles are suitable for operating on highways and at highway speeds. So, for most vehicle types, the lower limit of the range is the minimum speed while the upper limit of the range is the maximum speed. There may be reason to limit the speed of heavy trucks, so the range of speed programmed for the traction motors of a heavy truck may have an upper limit that is less than the maximum speed of the traction motor. The range of speed program for the traction motors of a tractor or construction equipment may also be limited, so the upper limit of the speed for tractors and construction equipment is less, and possibly significantly less, then the maximum speed of the traction motor.

Seat Movement

A seat 120 may include a base 124 and a back 122. A person sits on the base 124 and leans back onto the back 122. The seat 120 may move (e.g., forward, backward), with respect to the front of the electric vehicle 100, as a whole. The base 124 may tilt (e.g., forward, backward). The back 122 may tilt (e.g., forward, backward). The same type of seat may be used in many different types of electric vehicles. The movement of the seat may be set (e.g., programmed) so that the seat operates (e.g., moves) in a range. The seat 120 installed into one type of electric vehicle may have a first range of movement, while the seat 120 installed in another type of electric vehicle may have a second range of movement.

The movement of the seat 120 and/or the tilting of the base 124 and/or the back 122 may be controlled by any type of electromechanical device including stepper motors, solenoids and linear actuators. The device that controls movement of the seat, the base and/or the back 122 may be programmed to limit its movement which thereby limits the movement and/or tilting of the seat. The device may be programmed to move between a lower limit and an upper limit or a forward limit and a backward limit.

Figure 9:
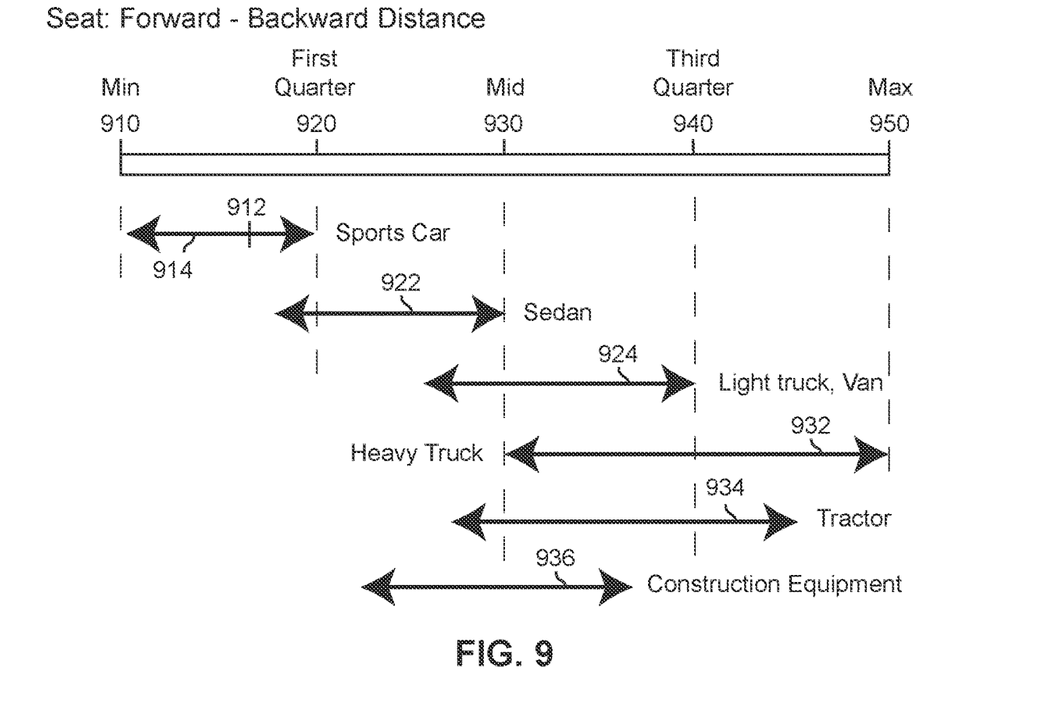
FIG. 9 is a diagram of example ranges of forward-backward seat position for different types of electric vehicles.

In an example embodiment, referring to FIG. 9, the range 914 of movement of the seat 120 in the forward and backward direction for a sports car may have a lower limit of a minimum distance 910 and an upper limit of a first quarter distance 920. A range 922 of movement of the seat 120 for a sedan may have a lower limit of just less than the first quarter distance 920 and an upper limit of the mid-distance 930. A range 924 of movement of the seat 120 for a light truck or van may have a lower limit of just less than the mid-distance 930 and an upper limit of a third quarter distance 940. A range 932 of movement of the seat 120 for a heavy truck may have a lower limit the mid-distance 930 and an upper limit of the maximum distance 950. A range 934 of movement of the seat 120 for a tractor may have a lower limit of just less than the mid-distance 930 and an upper limit of just less than the maximum distance 950. A range 936 of movement of the seat 120 for a construction equipment may have a lower limit less than the mid-distance 930 and an upper limit of more than the mid-distance 930. The range of linear movement of the seat depends on the size of the cabin in which the seat is positioned. Because a sports car has the least amount of room, its range is the smallest. Because the cabin of a heavy truck is likely large, the range of linear movement of the seat may also be large.

In an example embodiment, the plurality of systems of the electric vehicle 100 include the seat 120. The seat 120 is adapted to move forward and backward with respect to the steering wheel 146. The seat 120 moves within the range provided by the processing circuit 110 whereby the seat 120 moves between the lower operating limit and the upper operating limit of the range. The lower operating limit comprises a maximum rearward position and the upper operating limit comprises a maximum forward position. The seat 120 moves between the maximum rearward position and the maximum forward position. In an example embodiment, the processing circuit 110 gets the range from a vehicle type record.

Seat Back Tilt

Figure 10:
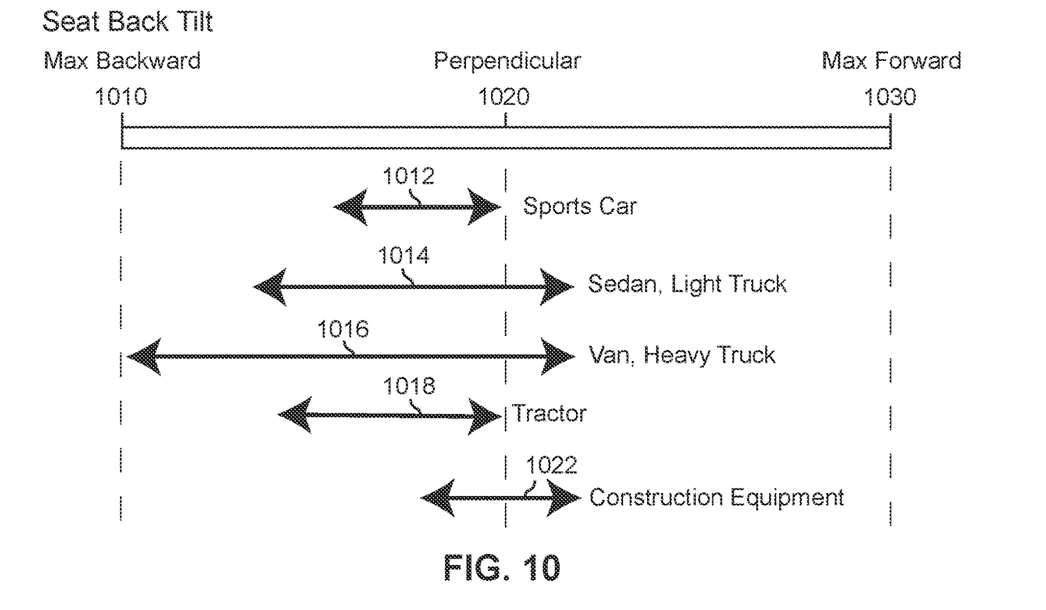
FIG. 10 is a diagram of example ranges of seat back tilt for different types of electric vehicles.

The amount of tilt of the back 122 of the seat 120 depends on the amount of room in the cabin behind and in front of the seat. In an example embodiment, the seat 120 may be programmed so that the range of tilt of the back 122 of the seat 124 ranges from the perpendicular position 1020 and backward to some extent. Sedans and light trucks may have a range of tilt that is slightly forward of perpendicular and possibly more in the backward direction. Vans and heavy trucks may have a range of tilt slightly forward of the perpendicular position 1020 to a maximum backward tilt 1010 so that a person may tilt the back 122 of the seat 120 backward for sleep. The tilt of the back 122 of the seat 120 for a tractor or construction equipment may range forward and/or backward from the perpendicular position 1020. The tilt of the back 122 of the seat 120 may range from the maximum backward tilt 1010 to a maximum forward tilt 1030 with a perpendicular position 1020 in between.

In an example embodiment, as shown in FIG. 10, the range of tilt of the back 122 of the seat 120 for the sports car, the sedan and the light truck, the van and the heavy truck, the tractor and the construction equipment are a range 1012, a range 1014, a range 1016, a range 1018 and a range 1022 respectively. The range 1012 and 1018 have a lower limit of backward from the perpendicular position 1020 and an upper range of the perpendicular position 1020. The range 1014, 1016 and 1022 have a lower limit of a backward from the perpendicular position 1020 and an upper range of forward of the perpendicular position 1020.

In an example embodiment, the plurality of systems of the electric vehicle 100 includes a seat 120 having a back 122, wherein the back 122 of the seat 120 is adapted to tilt forward and backward with respect to the steering wheel 146. The back 122 of the seat 120 tilts within the range provided by the processing circuit 110 whereby the back 122 of the seat 120 tilts between the lower operating limit and the upper operating limit of the range. The lower operating limit comprises a maximum rearward tilt and the upper operating limit comprises a maximum forward tilt. The back 122 of the seat 120 moves between the maximum rearward tilt and the maximum forward tilt. In an example embodiment, the processing circuit 110 gets the range from a vehicle type record.

Seat Base Tilt

Figure 11:
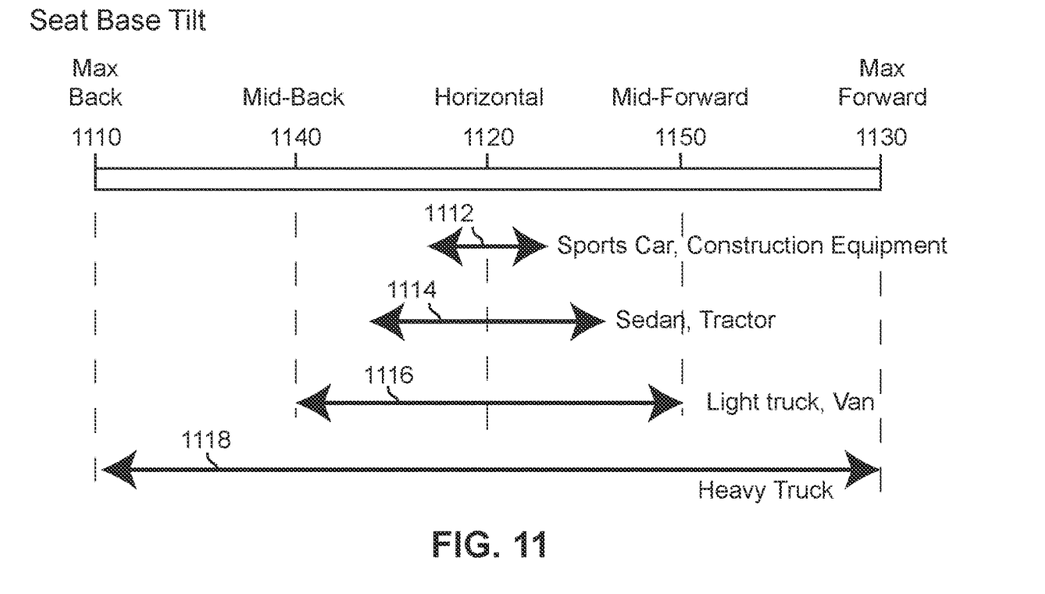
FIG. 11 is a diagram of example ranges of seat base tilt for different types of electric vehicles.

The tilt of the base 124 of the seat 120 may range from the horizontal position 1120 to a forward tilt (e.g., front lower than back) to a backward tilt (e.g., back lower than front). The range of the amount of tilt of the base 124 of the seat 120 may depend on the position of the controls operated by the feet of the driver, the height of the seat from the floor of the vehicle, the length of the driver's legs and ergonomic factors. The range of tilt of the base's 124 of the seat 120 for most types of vehicles is likely small.

In an example embodiment, referring to FIG. 11, the range of tilt of the base 124 of the seat 120 for the sports car and the construction equipment, the sedan and the tractor, the light truck and the van, and the heavy truck are a range 1112, 1114, 1116 and 1118 respectively. The range 1112 has a lower limit of slightly back from the horizontal position 1120 and an upper limit of slightly forward of the horizontal position 1120. The range 1114 has a lower limit of further back from horizontal position 1120 and an upper limit of further forward of the horizontal position 1120 when compared to the range 1112. The range 1116 has a lower limit of a mid-back tilt 1140 and an upper limit of a mid-forward tilt 1150. The range 1118 has a lower limit of the maximum back tilt 1110 and an upper limit of the maximum forward tilt 1130.

For a heavy truck, the seat 120 may tilt from the maximum back tilt 1110 to the maximum forward tilt 1130 because the seat is higher off the ground level than other vehicles and there is more room in the cabin. The range of the tilt of the base 124 of the seat 120 may be programmed.

Seat Heat and Massage

Figure 12:
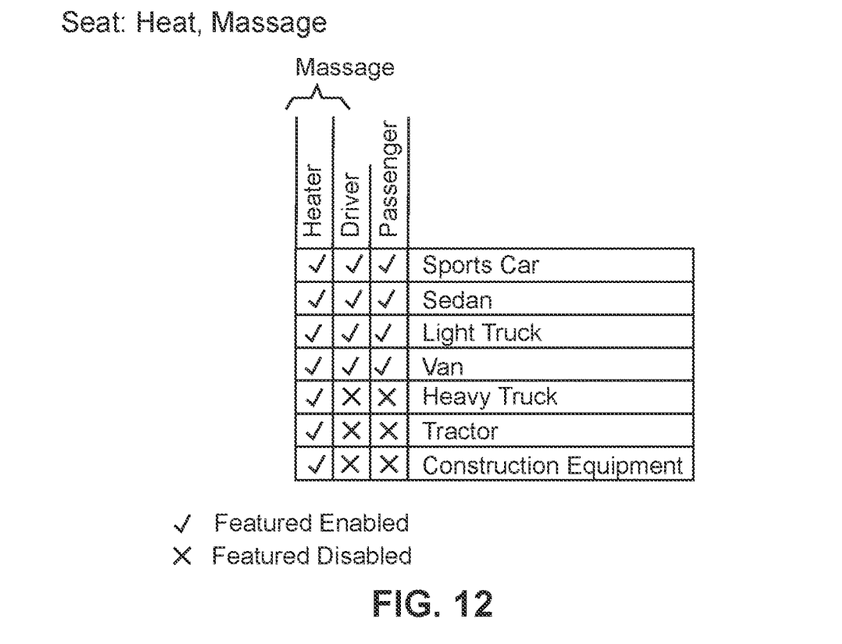
FIG. 12 is a table of seat heat and massage functions for different types of electric vehicles.

In an example embodiment, referring to FIG. 12, a seat may include components for heating the seat or for vibrating a portion (e.g., back 122) of the seat 120. The seat 120 may be programmed to provide or not provide the function. For example, even though a seat may include a heater or a vibrator, it may be programmed to either heat the seat 120 or vibrate the seat 120 or not heat or vibrate the seat 120. The seat 120 for most types of vehicles would be programmed to provide heat and vibration. Seats placed in tractors and construction equipment may include only the heat function, if that. With respect to the functions of heating and vibrating, the range includes provided or not provided. Either the seat 120 provides the function or does not provide the function. In other words, the upper range may be described as including the function and the lower range may be described as not including the function.

Infotainment System

An infotainment system 130 is a system that provides entertainment and/or information to a user of the vehicle. The infotainment system 130 may include a variety of functions. One or more functions may be programmed to operate in one type of the vehicle, but not to be available in another type of vehicle. As with the seat 120, the functions of the infotainment system 130 have the range of provided or not provided.

Figure 13:
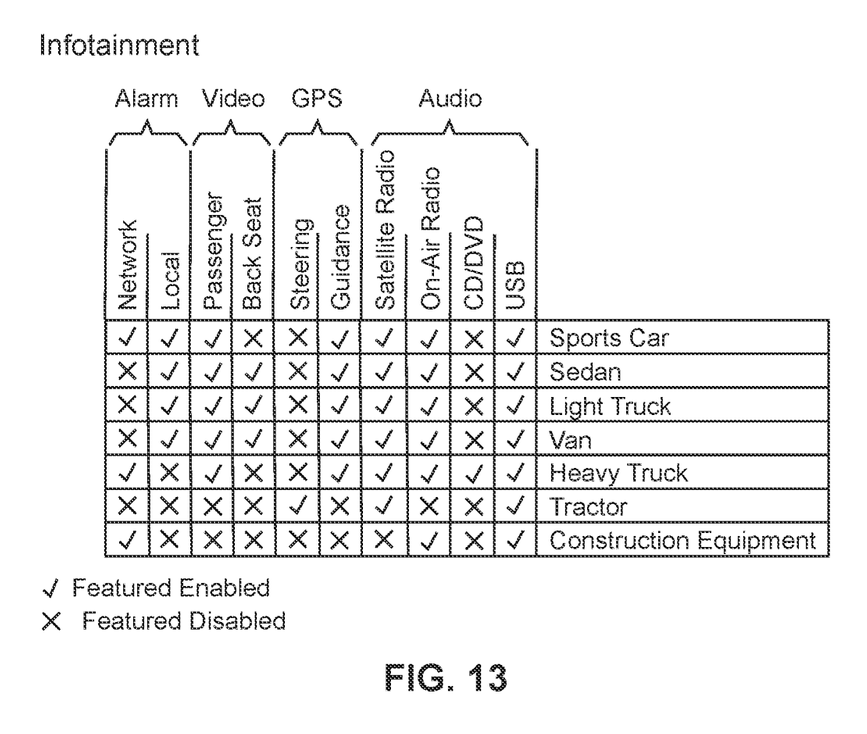
FIG. 13 is a table of infotainment functions for different types of electric vehicles.

The infotainment system 130, referring to FIG. 13, may be installed in any type of vehicle, but not all of the functions need to be enabled. For example, the infotainment system 130 installed in a sports car does not provide the GPS steering control function, the CD/DVD audio function or video to the backseat, since there likely is no backseat. The infotainment system 130 installed in a tractor does not provide most of the functions, except it may provide the GPS steering control in which the steering (e.g., 142, 144) of the tractor may be controlled by a global positioning system receiver. The steering may be controlled by a GPS receiver for traveling along a certain route, possibly to plant seed in parallel rows. The table of FIG. 13 shows how the infotainment system may be programmed to provide functions for example embodiments of different types of vehicles. A function of the infotainment system 130 able enabled or disabled by software or by writing a value into a register of the infotainment system 130. The processing circuit 110 may write the value that enables or disables the features of the infotainment system 130. In an example embodiment, the processing circuit 110 gets the information for enabling or disabling from a vehicle type record.

Example Embodiment

In an example embodiment, the electric vehicle 100 includes a traction motor 170, a suspension system 180, a brake system (e.g., 162, 164) and a processing circuit 110. The traction motor 170 is adapted to couple to one or more wheels 102 and/or 104. The traction motor 170 is adapted to generate a torque to rotate of the one or more wheels 102 and/or 104. The suspension system 180 is adapted to absorb an energy imparted to the one or more wheels 102 and/or 104 by a terrain over which the one or more wheels 102 and/or 104 travel. The brake system (e.g., 162, 164) adapted to provide a braking force to the one or more wheels 102 and/or 104 to slow the rotation of the one or more wheels 102 and/or 104.

The processing circuit 110 receives the vehicle type record 230 from the server 212. The vehicle type record 230 includes a first range (e.g., 238, 242) related to an operation of the traction motor 170, a second range (e.g., 238, 242) related to an operation of the suspension system 180 and a third range (e.g., 238, 242) related to an operation of the brake system (e.g., 162, 164). The processing circuit 110 provides the first range, the second range and the third range to the traction motor 170, the suspension system 180 and the brake system (e.g., 162, 164) respectively. The torque generated by the traction motor 170 is within the first range. The energy absorbed by the suspension system 180 is within the second range. The braking force provided by the brake system (e.g., 162, 164) is within the third range.

The first range includes a first lower limit (e.g., 272, 276) and a first upper limit (e.g., 270, 274). The torque generated by the traction motor 170 is greater than or equal to the first lower limit and less than or equal to the first upper limit. The second range includes a second lower limit and a second upper limit. The energy absorbed by the suspension system 180 is greater than or equal to the second lower limit and less than or equal to the second upper limit. The third range includes a third lower limit and a third upper limit. The braking force provided by the brake system (e.g., 162, 164) is greater than or equal to the third lower limit and less than or equal to the third upper limit.

The first range, the second range and the third range correspond to the vehicle type of the electric vehicle 100. Each vehicle type has a respective first range, second range and third range. The first lower limit, the second lower limit, the third lower limit, the first upper limit, the second upper limit and the third upper limit correspond to the vehicle type of the electric vehicle 100. Each vehicle type has respective ranges with lower limits and upper limits.

The electric vehicle 100 further comprises a type identifier 118. The type identifier 118 identifies the type of the electric vehicle 100. The vehicle type record 230 corresponds to the type identifier 118.

In Operation

In operation, the electric vehicle 100 includes a type identifier 118 that identifies the type of the vehicle. The electric vehicle 100 or a machine, such as computer, transmits the type identifier 118 to the server 212 which accesses the database 220 using the type identifier 118 as an index. The server 212 accesses a vehicle type record (e.g., 230, 250) for the vehicle type that includes the ranges for the systems for the type of vehicle. The server 212 transmits the vehicle type record back to the electric vehicle 100 or the machine. The electric vehicle 100 (e.g., processing circuit 110), or the machine, uses the information from the vehicle type record (e.g., 230, 250) to program the systems of the electric vehicle 100 to operate within the ranges in the record. After being program, the systems of the electric vehicle 100 operate within the ranges provided from the vehicle type record.

Figure 14:
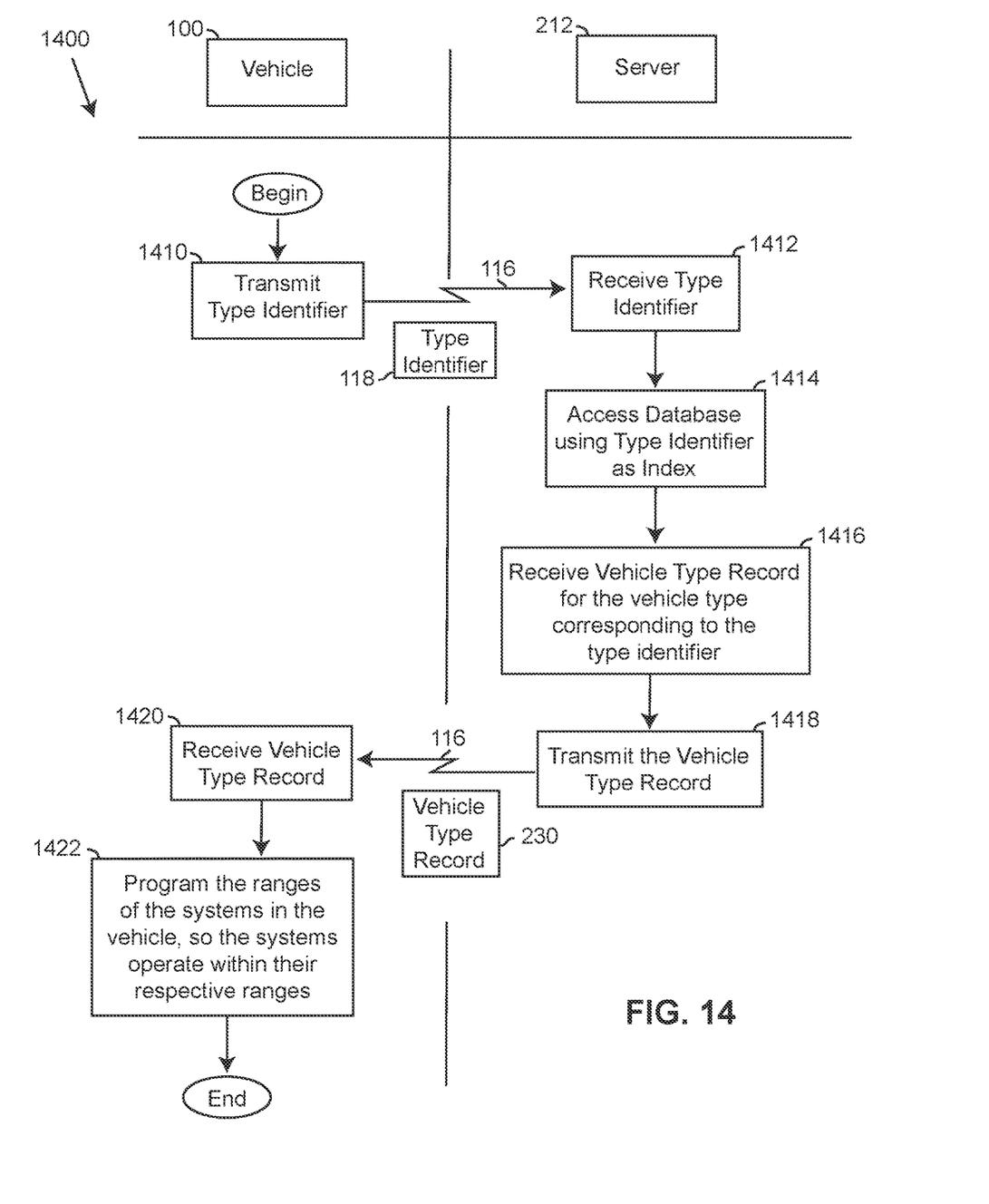
FIG. 14 is an example method using a vehicle type record to program the operation of one or more systems of an electric vehicle.

In an example method 1400, the electric vehicle 100 and the server 212 cooperate to receive the vehicle type record with the ranges from the database 220. The example method 1400 includes transmit 1410, receive 1412, access 1414, receive 1416, transmit 1418, receive 1420 and program 1422.

In transmit 1410, the electric vehicle 100 transmits the type identifier 118 for the electric vehicle 100 to the server 212. The electric vehicle 100 includes the processing circuit 110, the communication circuit 114 and the memory 112. The type identifier 118 may be stored in the memory 112. The processing circuit 110 accesses the memory 112 to retrieve the type identifier 118. The processing circuit 110 transmits the type identifier 118 to the server 212 via the communication circuit 114. The communication circuit 114 transmits the type identifier 118 using the communication link 116. The communication link 116 may be wired and/or wireless. The type identifier 118 may be transmitted to the server 212 via the network 210.

In receive 1412, the server 212 receives the type identifier 118 from the electric vehicle 100 via the communication link 116, the network 210 and the communication link 216.

In access 1414, the server uses the type identifier 118 to access the database 220. The type identifier 118 may be used to identify the vehicle type record associated with the type identifier 118. The vehicle type record associated with the type identifier 118 is the vehicle type record for type of the electric vehicle 100.

In receive 1416, the server 212 receives the vehicle type record 230 associated with the type identifier 118. The vehicle type record 230 includes the range 238 and 242 for the system 236 and 240 of the electric vehicle 100. The range 238 and 242 are the ranges to which the system 236 and the system 240 respectively should be programmed for proper operation in the vehicle type. The range 238 includes an upper limit 270 and a lower limit 272. The range 242 includes an upper limit 274 and a lower limit 276. As discussed above, a range may be expressed as enabling or disabling a function.

The vehicle type records (e.g., 230, 250) of the database 220 may be stored in any format. The vehicle type records may be arranged in the database 220 in any order. The vehicle type records in the database 220 may be indexed in any manner, including with respect to a type identifier (e.g., 118, 254) as discussed above.

In transmit 1418, the server 212 transmits the vehicle type record 230 associated with the type identifier 118 to the electric vehicle 100 via the communication link 216, the network 210 and the communication link 116.

In receive 1420, the electric vehicle 100 receives the vehicle type record 230. The processing circuit 110 of the electric vehicle 100 accesses the vehicle type record 230 and extracts the ranges for the systems of the electric vehicle 100.

In program 1422, the processing circuit 110 programs the various systems of the electric vehicle 100 so that they operate within the ranges specified in the vehicle type record 230. The processing circuit 110 communicates with each system identified in the vehicle type record 230. The processing circuit 110 transfers the range values from the vehicle type record 230 to each system of the electric vehicle 100. Each system receives the range values (e.g., upper limit, lower limit, enabled, disabled) and operates within the range of values.

In another example method, the method sets the range of operation of each system in an electric vehicle 100. The method is performed by the electric vehicle 100 and in particular the processing circuit 110 of the electric vehicle 100. The method includes transmitting the type identifier 118 to the server 212, receiving the vehicle type record 230 associated with the type identifier 118 from the server 212, and providing the respective ranges from the vehicle type record 230 to the one or more systems of the electric vehicle 100. The type identifier 118 identifies the type of the electric vehicle 100. The server 212 is adapted to maintain the database 220 of a plurality of vehicle type records (e.g., 230, 250). The server 212 is adapted to use the type identifier 118 as an index into the database 220 to access the vehicle type record associated with the type identifier 118. The vehicle type record includes a respective range of operation for the one or more systems of the electric vehicle 100. Each respective range includes a lower operating limit (e.g., lower limit) and an upper operating limit (e.g., upper limit). The one or more systems of the electric vehicle 100 operate to perform a respective function of the electric vehicle 100. Each system operates within the lower operating limit in the upper operating limit of its respective range.

Geometric and Driver Profiles

Once the range of operation of a system of the electric vehicle 100 has been set, the system operates with in the range. However, a more precise point within the range where the system operates may be further identified in or provided by geometric and/or driver profiles as disclosed in the '150 application identified and incorporated by reference above. For example, in an example embodiment, the range of the stopping force for a sports car is set in the range of the minimum stopping force 510 to the first quarter stopping force 540. Data from a driver profile may further instruct the stopping system (e.g., 160, 190, 170, 172, 162, 164) to operate in a narrower band of the range. For example, a driver profile may instruct the stopping system to operate in only half the range from the minimum stopping force 510 to the first quarter stopping force 540 (e.g., upper portion of the range) thereby providing sharper breaking.

In another example, the suspension system (e.g., 180, 182) for a sports car operates in the range 612 of the stiffness. The driver profile may instruct the suspension system to operate in the upper portion of the range 612 only (e.g., closer to the first quarter stiffness 620) because the driver personally prefers a stiffer suspension.

In another example, the seat position is set for the range from the minimum distance 910 to the first quarter distance 920 for the sports car. The geometric profile may instruct the seat to be positioned at a distance 912 in the range 914 because that setting is preferred by the driver.

Afterword

The foregoing description discusses embodiments (e.g., implementations), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that is not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. An electric vehicle comprising:
    a memory, the memory configured to store a type identifier, the type identifier identifies a type of the electric vehicle, the type identifier corresponds to a vehicle type record stored in a provided database;
    a processing circuit, the processing circuit configured to access the memory to retrieve the type identifier;
    a communication circuit, the communication circuit configured to receive the type identifier from the processing circuit, the communication circuit configured to transmit the type identifier via a wireless communication link, the communication circuit configured to receive the vehicle type record from the provided database responsive to transmitting the type identifier, the communication circuit configured to provide the vehicle type record to the processing circuit;
    a wheel; and
    a traction motor, the wheel coupled to the traction motor, the traction motor coupled to the electric vehicle, the traction motor configured to rotate the wheel to move the electric vehicle, the processing circuit configured to program the traction motor in accordance with the vehicle type record; wherein:
        the vehicle type record includes one torque setting selected from a plurality of torque settings, each torque setting includes a first lower limit and a first upper limit;
        the vehicle type record further includes one RPM setting selected from a plurality of RPM settings, each RPM setting includes a second lower limit and a second upper limit;
        the one torque setting and the one RPM setting correspond to the type of the electric vehicle;
        the first upper limit of each torque setting of the plurality of torque settings differs from the first upper limit of all other first upper limits of the plurality of torque settings;
        the second upper limit of each RPM setting of the plurality of RPM settings equals a majority of all other second upper limits of the plurality of torque settings;
        the processing circuit programs the traction motor with the one torque setting and the one RPM setting; and
        responsive to be programmed, the traction motor configured to generate a torque within the first lower limit and the first upper limit of the one torque setting and rotates within the second lower limit and the second upper limit of the one RPM setting, whereby the torque and RPMs generated by the traction motor is consistent with the type of the electric vehicle.

2. The electric vehicle of claim 1 wherein the first upper limit of a first, a second, a third, and a fourth torque setting of the plurality of torque settings is 33%, between 33% and 66%, 66%, and 100% respectively of a maximum torque of the traction motor.

3. The electric vehicle of claim 1 wherein the first lower limit and the first upper limit of each torque setting increases in accordance with a weight of the electric vehicle.

4. The electric vehicle of claim 1 wherein:
    the type of the electric vehicle is a sports car;
    the type identifier corresponds to the sports car;
    the first upper limit of the one torque setting of the vehicle type record is 33% of a maximum torque of the traction motor; and
    the second upper limit of the one RPM setting is 100% of a maximum RPM of the traction motor.

5. The electric vehicle of claim 1 wherein:
    the type of the electric vehicle is a sedan;
    the type identifier corresponds to the sedan;
    the first upper limit of the one torque setting of the vehicle type record is between 33% and 66% of a maximum torque of the traction motor; and
    the second upper limit of the one RPM setting is 100% of a maximum RPM of the traction motor.

6. The electric vehicle of claim 1 wherein:
    the type of the electric vehicle is a light truck;
    the type identifier corresponds to the light truck;
    the first upper limit of the one torque setting of the vehicle type record is 66% of a maximum torque of the traction motor; and
    the second upper limit of the one RPM setting is 100% of a maximum RPM of the traction motor.

7. The electric vehicle of claim 1 wherein:
    the type of the electric vehicle is a heavy truck;
    the type identifier corresponds to the heavy truck;
    the first upper limit of the one torque setting of the vehicle type record is 100% of a maximum torque of the traction motor; and
    the second upper limit of the one RPM setting is 75% of a maximum RPM of the traction motor.

8. The electric vehicle of claim 1 further comprising a brake system, wherein:
    the brake system is configured to provide a braking force to the wheel to slow a rotation of the wheel;
    the processing circuit further configured to program the brake system in accordance with the vehicle type record;
    the vehicle type record further includes one brake setting selected from a plurality of brake settings, each brake setting includes a third lower limit and a third upper limit;
    the one brake setting corresponds to the type of the electric vehicle;
    the third upper limit of each brake setting of the plurality of brake settings differs from the third upper limit of all other third upper limits of the plurality of brake settings;
    the processing circuit programs the brake system with the one brake setting; and
    responsive to be programmed, the brake system generates the braking force within the third lower limit and the third upper limit of the one brake setting, whereby the braking force is consistent with the type of the electric vehicle.

9. The electric vehicle of claim 8 wherein:
    the type of the electric vehicle is a sports car;
    the type identifier corresponds to the sports car; and
    the third upper limit of the one brake setting of the vehicle type record is 25% of a maximum braking force of the brake system.

10. The electric vehicle of claim 8 wherein:
    the type of the electric vehicle is a sedan;
    the type identifier corresponds to the sedan; and
    the third upper limit of the one torque setting of the vehicle type record is 50% of a maximum braking force of the brake system.

11. The electric vehicle of claim 8 wherein:
the type of the electric vehicle is a light truck;
the type identifier corresponds to the light truck; and
the third upper limit of the one torque setting of the vehicle type record is 75% of a maximum braking force of the brake system.

12. The electric vehicle of claim 8 wherein:
the type of the electric vehicle is a heavy truck;
the type identifier corresponds to the heavy truck; and
the third upper limit of the one brake setting of the vehicle type record is between 75% and 100% of a maximum brake force of the brake system.

13. The electric vehicle of claim 9 further comprising a suspension system, wherein:
the suspension system is configured to provide a suspension stiffness to the wheel to keep the wheel on a ground and to cushion the electric vehicle from bumps and an evenness on a road;
the processing circuit further configured to program the suspension system in accordance with the vehicle type record;
the vehicle type record further includes one suspension setting selected from a plurality of suspension settings, each suspension setting includes a fourth lower limit and a fourth upper limit;
the one suspension setting corresponds to the type of the electric vehicle;
the fourth upper limit of each suspension setting of the plurality of suspension settings differs from the fourth upper limit of all other fourth upper limits of the plurality of suspension settings;
the processing circuit programs the suspension system with the one suspension setting; and
responsive to be programmed, the suspension system generates the suspension stiffness within the fourth lower limit and the fourth upper limit of the one suspension setting, whereby the suspension stiffness is consistent with the type of the electric vehicle.

14. The electric vehicle of claim 13 wherein:
the type of the electric vehicle is a sports car;
the type identifier corresponds to the sports car; and
the fourth upper limit of the one suspension setting of the vehicle type record is 100% of a maximum suspension stiffness of the suspension system.

15. The electric vehicle of claim 13 wherein:
the type of the electric vehicle is a sedan;
the type identifier corresponds to the sedan; and
the fourth upper limit of the one suspension setting of the vehicle type record is 25% of a maximum suspension stiffness of the suspension system.

16. The electric vehicle of claim 13 wherein:
the type of the electric vehicle is a light truck;
the type identifier corresponds to the light truck; and
the fourth upper limit of the one suspension setting of the vehicle type record is 50% of a maximum suspension stiffness of the suspension system.

17. The electric vehicle of claim 13 wherein:
the type of the electric vehicle is a heavy truck;
the type identifier corresponds to the heavy truck; and
the fourth upper limit of the one suspension setting of the vehicle type record is between 75% and 100% of a maximum suspension stiffness of the suspension system.

\* \* \* \* \*